(12) United States Patent
Darcie et al.

(10) Patent No.: US 9,241,049 B2
(45) Date of Patent: Jan. 19, 2016

(54) SYSTEM AND METHOD FOR EFFICIENT NETWORKING FOR LARGE FILE TRANSACTIONS

(76) Inventors: Thomas E. Darcie, Victoria (CA); Sudhakar Ganti, Victoria (CA); Ilijc Albanese, Victoria (CA)

( * ) Notice: Subject to any disclaimer, the term of this patent is extended or adjusted under 35 U.S.C. 154(b) by 615 days.

(21) Appl. No.: 13/458,803

(22) Filed: Apr. 27, 2012

(65) Prior Publication Data

US 2012/0278446 A1    Nov. 1, 2012

Related U.S. Application Data

(60) Provisional application No. 61/479,514, filed on Apr. 27, 2011.

(51) Int. Cl.
| | |
|---|---|
| *G06F 15/16* | (2006.01) |
| *H04L 29/06* | (2006.01) |
| *H04L 12/913* | (2013.01) |
| *H04L 12/773* | (2013.01) |

(52) U.S. Cl.
CPC .............. *H04L 69/26* (2013.01); *H04L 47/724* (2013.01); *H04L 65/607* (2013.01); *H04L 65/80* (2013.01); *H04L 45/60* (2013.01)

(58) Field of Classification Search
CPC .... H04L 65/1069; H04L 47/18; H04L 47/783
USPC ........................................................ 709/219
See application file for complete search history.

(56) References Cited

U.S. PATENT DOCUMENTS

| | | | | |
|---|---|---|---|---|
| 6,141,385 | A * | 10/2000 | Yamaji | 375/240.27 |
| 7,242,437 | B2 * | 7/2007 | Sullivan | 348/500 |
| 7,260,112 | B2 * | 8/2007 | Moretti et al. | 370/467 |
| 7,760,744 | B1 * | 7/2010 | Mohaban | 370/401 |
| 7,924,716 | B2 * | 4/2011 | Corliano et al. | 370/230 |
| 8,711,830 | B2 * | 4/2014 | Wason et al. | 370/347 |
| 2006/0198353 | A1 * | 9/2006 | Wason et al. | 370/347 |
| 2009/0290531 | A1 * | 11/2009 | Connors et al. | 370/316 |
| 2010/0061400 | A1 * | 3/2010 | Hong et al. | 370/466 |

OTHER PUBLICATIONS

Whitehead et al., "Experiments of Large File Caching and Comparisons of Caching Algorithms," 7th IEEE Int. Symp. on Network Computing and Applications, 2008—NCA '08, Jul. 10-12, 2008, pp. 244-248.

Tucker et al., "Evolution of WDM Optical IP Networks: A Cost and Energy Perspective," IEEE J. Lightwave Technology, 27:243-252 (Feb. 2009).

Battestilli and Perros, "An introduction to optical burst switching," IEEE Commun. Mag., 41:S10-S15 (Aug. 2003).

(Continued)

*Primary Examiner* — Kristie Shingles
*Assistant Examiner* — Timothy Sowa
(74) *Attorney, Agent, or Firm* — Klarquist Sparkman, LLP (57) ABSTRACT

A novel overlay networking method designed specifically to handle the large file transfers that constitute a large and growing portion of media-rich Internet traffic is disclosed. The proposed system and method uses large (e.g., 10 MB) packets or Media Frames (MF) and orderly concatenations of these frames into chains (MC) to achieve a considerable reduction in power consumption relative to current IP Internet routers. Transmission of each MC is scheduled, while individual MFs are routed directly in interstices within MCs.

13 Claims, 8 Drawing Sheets

(56) References Cited

OTHER PUBLICATIONS

Ganguly and Chan, "A scheduled approach to optical flow switching in the ONRAMP optical access network testbed," Optical Fiber Communication Conference and Exhibit, 2002, Mar. 17-22, 2002, pp. 215-216.

Barakat and Darcie, "Control-Plane Congestion in Optical-Burst-Switched Networks," IEEE J. Selected Areas in Commun.—Optical Commun. and Networking Series, Aug. 2009.

Ravikumar et al.,"EaseCAM: an energy and storage efficient TCAM-based router architecture for IP lookup," IEEE Trans. on Computer, 54:521-533 (May 2005).

S. Aleksic, "Analysis of Power Consumption in Future High-Capacity Network Nodes," Journal of Optical Communications and Networking, 1:245-258 (Aug. 2009).

Ye et al., "Analysis of power consumption on switch fabrics in network routers," Proceedings of the $39^{th}$ Design Automation Conference, pp. 524-529 (2002).

Agrawal and Sherwood, "Modeling TCAM power for next generation network devices," 2006 IEEE International Symposium on Performance Analysis of Systems and Software, pp. 120-129 (Mar. 19-21, 2006).

OMNET++ Discrete Event Simulation Tool. http://www.omnetpp.org.

* cited by examiner

SYSTEM AND METHOD FOR EFFICIENT NETWORKING FOR LARGE FILE TRANSACTIONS

CROSS REFERENCE TO RELATED APPLICATION

This application claims the benefit of U.S. Provisional Application 61/479,514, filed Apr. 27, 2011, which is incorporated herein by reference.

FIELD

The invention relates to networking and the future evolution of the Internet, where increased efficiency and decreased power consumption can be achieved through an overlay network specifically designed to handle very large data packets that are representative of present-day and future large file transactions.

BACKGROUND

Continued growth of Internet applications depends on continued decrease in the cost relative to performance of Internet Protocol (IP) routing and transport. While IP routers and optical transport continue to advance, two trends suggest motive for deviating from the standard path. First, recent studies support the common observation that data file sizes are growing, and that distribution and sharing of large media files are becoming the dominant and fastest growing components of bandwidth transacted. Second, power consumption of routers is becoming a serious concern in terms of hardware design and cooling, operational cost, and carbon-conscious social responsibility. Since this is driven in part by the increasing number of packets processed, the use of fewer large packets together with efficient routing methods is required.

Historical constraints in router design, limited application bandwidth and high transmission error probabilities led to the definition of Ethernet packets containing up to 1500 bytes. As these constraints have relaxed, Jumbo and Super jumbo frames have been defined, pushing frame sizes to 64KBytes. Packet header parsing for large files is more efficient if bigger frames are used, but the tradeoff between compatibility with existing equipment and efficiency are subject of debate (e.g., IEEE 802.3as Frame Expansion Task Force). On the other extreme, optical burst (OBS) or flow switching (OFS), or the notion of user-controlled end-to-end lightpaths (e.g. CAnet 4 and All-Optical Network) offer up to an entire wavelength for some time, through which GB files can be delivered. But these "optical" approaches are not embraced by industry and the power efficiency of optical switching is questionable. We have shown recently that if OBS does prove useful, control plane congestion would limit application to large burst sizes, placing a lower bound on the holding times of optical channels.

Given these considerations, a future networking methodology is required that: a) exploits the advantages of electronic switching, control and buffering; b) exploits the advantages of high-speed dense wavelength-division multiplexed optical transmission; c) builds upon the well-entrenched and highly effective current methodologies for IP networking; d) creates an overlay network optimized for networking and distribution of very large (media) files; and e) enables a significant reduction in cost (power consumption, carbon footprint, physical size, etc.) relative to existing router networks in handling high volumes of large file transfers.

In this patent we describe a system that is a key step in developing such a methodology. We begin with the definition of a media frame (MF)—a large structured container that contains typically 10 MB of information. Recognizing that most large media files will fill many such MFs, a networking approach is defined that uses an end-to-end admission control mechanism to express-forward chains of MFs (media chain or MC) at intermediate network nodes. MCs are treated as indivisible entities and enable efficient transport of large volumes of information with minimal buffering and header computation. In addition, as this end-to-end admission control will be cumbersome for individual MFs or transactions involving only a few MFs, provision is made for the contention-based connectionless routing of individual MFs in interstitials introduced into and between the MCs. We refer to these as directly-routed frames or DRFs. Hence each of our media frame routers (MFRs) is able to express route MCs, while using more conventional routing (electronic buffering, no end-to-end set up) for DRFs.

SUMMARY

According to some examples, methods include dividing content into a plurality of media frames so as to define a media chain and establishing one or more interstices between the media frames. A media chain header is included in at least one of the plurality of media frames, and comprises indications of at least one of media frame length and media frame interstice locations. The media chain is communicated over a wired or wireless network. In typical examples, the media chain header comprises an indication of a period between interstices. In other examples, methods include reserving a path for communication of the media chain. In other embodiments, a path for communication of the media chain is requested, and the media chain is communicated in response to approval of the path request. In some examples, the path request includes communicating a control packet associated with media chain length, media chain transparency, and media chain destination.

According to representative examples, routers comprise a processor and a memory storing processor-executable instructions for a method that includes receiving a request for transmission of a media chain comprising a concatenation of media frames. The request includes at least one of a media chain length, a media chain transparency, and a media chain destination. Information describing the propagation time associated with one or more hops in the path is received, and a path is identified having a plurality of hops for communicating the media chain. Available time slots for communication of the media frames of the media chain at the plurality of hops in the path are obtained, wherein the time slots are identified based on one or more of the transmission and propagation delays to the router, hop distances along the path, and propagation and processing times associated with at least one hop of the path. In some representative examples, the method includes communicating a control packet to at least one node along the path. The control packet includes one or more of a sender address, a destination address, a media chain length, a transparency degree, an expected arrival time, and an identifier associated with the media chain. In typical embodiments, the method includes communicating a reservation confirmation responsive to the request for transmission of the media chain.

In other examples, methods comprise communicating a request for transmission of a media chain, wherein the request includes at least one of a media chain length and a media chain destination. A reservation confirmation is received in response to the request for transmission, and a media chain transmission is initiated in response to the reservation confirmation.

In further examples, methods comprise dividing content into a plurality of media frames so as to define a media chain and establishing one or more interstices between the media frames. A media chain header is included in at least one of the plurality of media frames, wherein the header comprises indications of at least one of the media frame length and media frame interstice locations. The media chain is communicated and a directly-routable frame is inserted into an interstice.

In still other embodiments, routers include a processor and a memory storing processor-executable instructions for a method. According to the method, a request for transmission of a media chain comprising a concatenation of media frames is received. The request includes at least one of a media chain length, a media chain transparency, and a media chain destination. Information describing the propagation time associated with one or more hops in the path is received, and a path having a plurality of hops for communicating the media chain is identified. Available time slots for communication of the media frames of the media chain at the plurality of hops in the path are identified based on transmission and propagation delays to the router, hop distances along the path, and propagation and processing times associated with at least one hop of the path. A directly-routable frame is inserted into an interstice introduced into the media chain or between successive media chains.

Other representative methods of communicating data files through a router network comprise packaging the data files into media frames comprising header information and payload, wherein the header information includes at least address information. A concatenation threshold is defined such that files that occupy a greater number of media frames than the threshold are concatenated into media chains which contain interstices. Transmission of media chains through the router network is scheduled and media frames are directly routed from files below the concatenation threshold through the router network in the interstices.

The foregoing and other objects, features, and advantages of the invention will become more apparent from the following detailed description, which proceeds with reference to the accompanying figures.

DETAILED DESCRIPTION

The detailed description of this networking approach is organized as follows. Section I provides the architecture for networking using MFs. Representative basic structures for MFs and MCs are defined in Section II. Motivation and anticipated benefit are discussed in Section III. In Section IV we discuss issues associated with networking using MFs and MCs, including admission control and scheduling for chains, queuing for frames, and mechanisms that allow the co-existence of these two networking approaches. In section V, a representative description of the computer system implementation of the approach is presented. A representative simulation of a simple MF network is then presented in Section VI, from which various performance metrics are deduced and discussed.

I. Network Topology and Large File Flows

Figure 1:
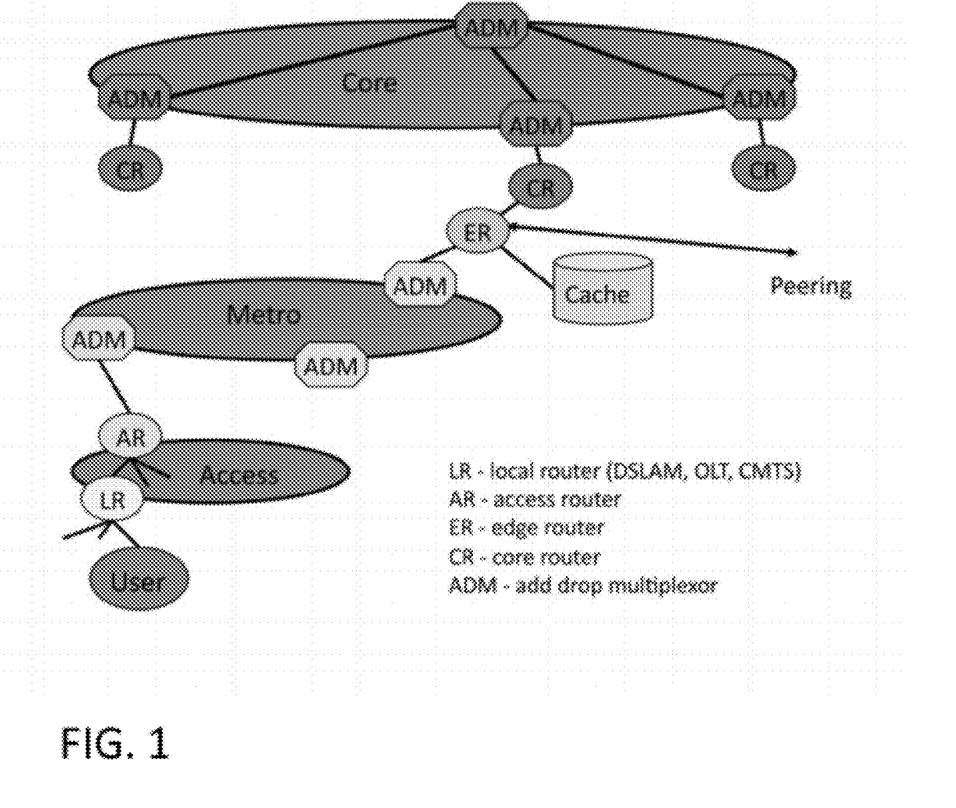
FIG. 1: Reference Architecture
Figure 2:
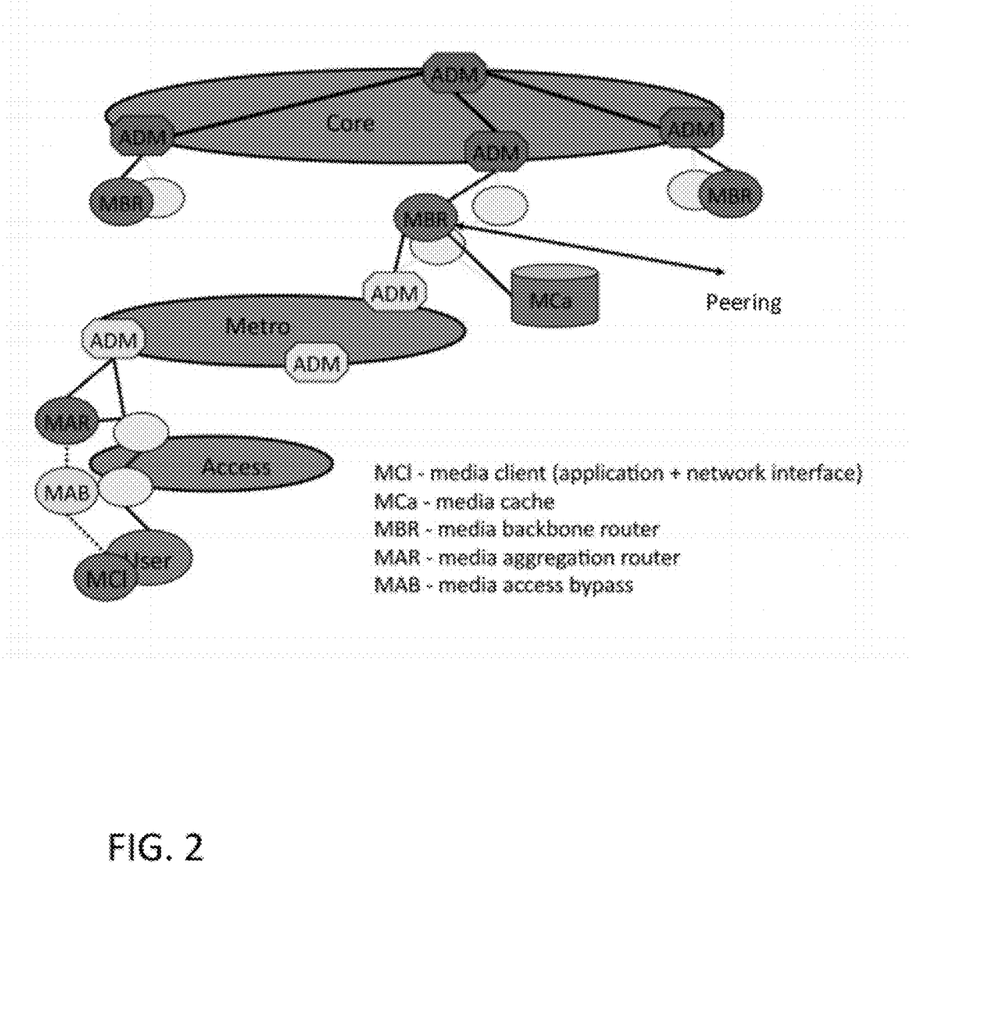
FIG. 2: Media Frame Overlay Network

Discussion of MF networking is best framed by the reference architecture shown in FIGS. 1 and 2. FIG. 1 shows a hierarchical network representative of the current state-of-the-art comprising various sizes of routers (access, edge, and core) connected to a transport network through various sizes of add-drop multiplexers. In present implementations the add-drop multiplexers would use SONET, but this reference architecture also supports optical add-drop technologies. An important component is interconnection between various carrier networks through peering arrangements, typically facilitated through regional or Metro-area exchange points.

Primary examples of large-file transactions can be superimposed onto this reference architecture. These examples include: 1) Regionally cached media download—In this case, typically encountered through media file downloads from regional cached distribution servers at the end points of typical Content Delivery Networks (CDN), large files are delivered from the regional cache, through Metro and access, to end-users. As evidenced by the popularity of CDN and rapid proliferation of video-related download applications, these downloads represent a significant fraction of traffic growth; 2) Source-to-cache media distribution—To deliver content to the CDN distribution servers, large file transfers must be distributed from sources, typically across a core network, to the regional cache; 3) End-to-end file transfers—For peer-to-peer applications, or for files for which widespread distribution is not anticipated, the regional cache is bypassed and files are transacted through Metro and access, possibly across the core network, directly to an end-user. Peer-to-peer applications drive a significant fraction of bandwidth utilization, particularly in access and metro networks; and 4) Any of the above through peering—Transaction classes 1-3 can occur for files that originate or terminate in another carrier network and pass through the peering exchange.

Our challenge is to understand the opportunity for a networking hierarchy based on MFs to benefit the scaling of these bandwidth hungry transactions. To explore these possibilities we consider the overlay presented in FIG. 2. Each of the "media" boxes parallels a present-day counterpart and supports the origination or termination (media client interface (MCI)), access bypass (media access bypass (MAB)), aggregation and admission (media aggregation router (MAR)), and efficient end-to-end routing (media backbone router (MBR)), in accordance with the principles described below for MFs. In addition, it is convenient to consider regional storage of MFs in a media frame cache (MCa).

An obvious challenge to any new end-to-end methodology is effecting change in access, where the large embedded base consisting of a diverse array of existing systems is in place and costly to replace. Since our intention is to not restrict application to specialized nodes (e.g., campuses), but rather to reach broadly distributed consumers, methods must be established to transport MFs through access. Two alternatives are represented in FIG. 2. A conservative approach involves an application operable between the MCI and the MAR such that using traditional broadband access alone, MFs and MCs are assembled or disassembled at the MAR. This is functionally parallel to the burst assembly routers proposed for use in optical burst switching. A more aggressive approach involves engaging the evolution of optical access standards (e.g. Passive Optical Network (PON), where standards for 10 Gb/s shared bandwidth have emerged recently), to enable higher dedicated bandwidths perhaps through wavelength overlays. MFs and MCs would then be assembled at the user end point or client directly.

II. Media Frames and Media Chains

The focus of this patent is to provide a networking strategy based on very large packets (MF). These are either transmitted individually as directly-routed packets (DRF) or concatenated in chains (MC) for scheduled express delivery. At this point it is not necessary to develop a full specification for what lies within each media frame. Rather, we limit discussion to a simple functional definition.

A. Media Frames

As mentioned previously, a MF is an indivisible structured block containing, for example, 10 MB of data plus overhead. Substantially larger or smaller MFs are also contemplated, limited on the low side by the need to offer advantage over existing IP standards and on the high side by the need to share network resources between multiple transactions. Overhead may include address, priority, concatenation details (specifying MCs), coding, and management information. Given the very large capacity within each MF, considerable header information (e.g. 10 KB) can be included with minimal impact on throughput. Structure may be defined to facilitate error correction, segmentation, security, file compression, and easy assembly from a large numbers of smaller IP packets.

B. Media Chains

Figure 3:
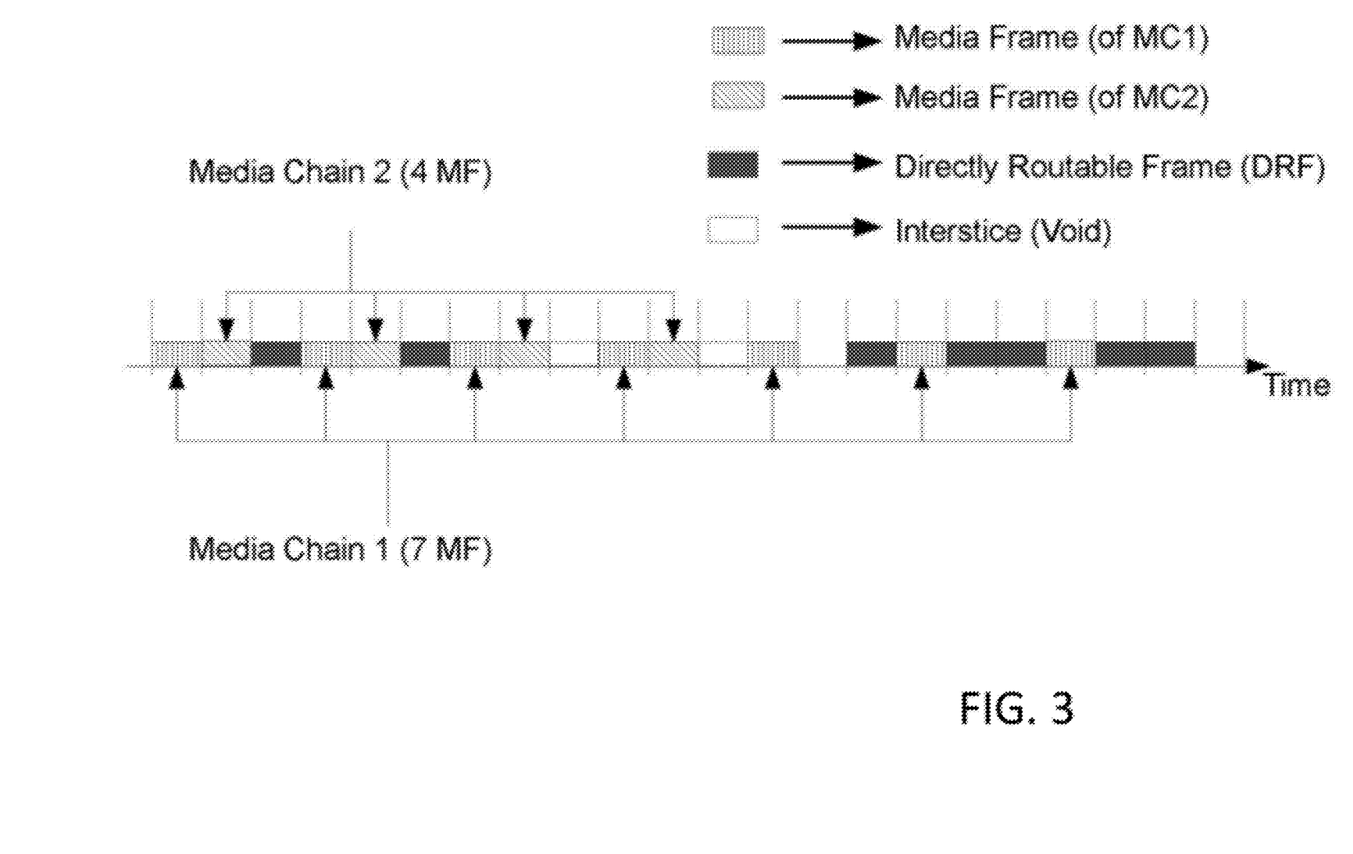
FIG. 3: Two MCs, DRFs and Voids in a channel

For file sizes substantially greater than 10 MB, MFs can be concatenated into MCs (FIG. 3). Information about an entire MC, including length and transparency degree (the number of interstices or period between two repeating MFs in a chain) can be replicated within the overhead in each MF. Thus only one header is needed to individuate the whole chain and the locations of its interstices. This data provides the MFR with timing information needed to find each MC within the channel.

Transparency of each MC is a design parameter that offers significant flexibility. Defined such that the chains presented in FIG. 3 would have a transparency of 3, transparency provides two primary functions. First, given the large size of each MF, concatenations of multiple MFs without transparency would introduce substantial latency by occupying network resources for substantial durations (1 MF=10 MB=80 Mb=2 ms@40 Gbps OC768 transmission). Transparency preserves logical continuity of concatenated MFs to simplify scheduling and routing, while allowing MCs to pass through each other at intermediate nodes. As shown later, we will use buffering only to affect timing, and rely on transparency to ease the constraints on end-to-end path set up for any given chain in the presence of inevitable conflicts at a particular node. Also, transparency provides numerous voids into which directly routed frames (DRFs) can be inserted, again with minimal latency. Second, we may anticipate bit rates of 10 Gbps in access networks at a time when bandwidths in core networks will be 100 Gbps. Transmission from access must then be up-shifted in rate, resulting in, for this case, 10% time occupancy. This would be accommodated naturally by a transparency of 10.

C. Conformance with Existing Physical Layer

Rather than attempting to redesign physical layer provisioning and restoration to support MFs, we exploit optical transport networks based on both Ethernet and SONET. Fortunately, the successful convergence between SONET OC192c and 10 GE WAN standards provides opportunity for a convenient transport structure that is entirely compatible with both existing types of transport networks. While differences do exist in protection switching capability, clock jitter tolerance, and other networking capabilities, both provide a common payload capability of roughly 9.6 Gb/s. With our MF containing roughly 10 MB, this payload supports 120 MF/s. As popular line rates increase to 40 Gb/s, 100 Gb/s, and beyond, we would continue to exploit this common payload.

III. Motivation and Anticipated Benefit

It is anticipated that the use of media frames and chains will result in several benefits, as follows:

A. Power Consumption and Routers

As mentioned previously, scaling IP based routers to meet future demand is challenging. Several studies have described these scaling difficulties and broken down power consumption into the constituent functional processes. Various all-optical switching approaches have not improved the situation. Studies using small switches (8×8 cross bar) suggest that most power is consumed either in the header look-up or in the switching functions. For small packets (e.g., 50 bytes) look-up dominates. For packets in excess of 500 bytes, switching functions, which are largely invariant to packet size, dominate. Based on these studies, it is safe to say that the use of MFs would slash look-up power consumption to negligible levels, even in the case where all traffic was in DRFs. However, it may also be the case that look-up power consumption would be reduced to a sufficient level relative to switching power consumption using approaches already standardized, such as Jumbo frames. In the issue of power consumption in larger scale networks is addressed concluding that power consumption of header related functions is far larger than switching. This result suggests considerable advantage to an MF-based approach.

B. Tight Coupling to Optical Transport Systems

In addition to reducing header related power consumption, the organized and highly structured representation of MCs provides opportunities for reducing switching power consumption. In a traditional IP router switch fabric the highly dynamic nature of traffic makes it essential to maintain a dynamic capability in switching each relatively small packet, as implemented for example in shared memory switches. For MCs, the input to output path is scheduled, predictable, and sufficiently stable over time scales more than 1000 times greater than traditional router traffic. This is also true to a lesser degree for individual DRFs, as these are not scheduled. We anticipate that this will allow electronic switching methodologies that are more tightly coupled to optical transport systems, allowing a reduction of switching related power consumption.

C. Efficient Throughput for DRFs and Scheduled MCs

Our basic premise is that very large file transactions can be packaged conveniently into large containers and that more efficient means can be devised to transport concatenations of these large containers. Analogies in mail service, rail transportation, and container shipping are convenient representations. An MC consisting of a large number of concatenated MFs (e.g. 100 MFs=1 GB) is an entity worthy of the signaling overhead associated with end-end reservation, admission control, and right of way at intermediate nodes (e.g. level crossings for rail systems). This is clearly not justified for traditional IP packets. Utilization and other performance metrics can be high with any reservation-based system, performance that we exploit with our MCs. Note that the periodicity of the MFs in an MC simplifies scheduling since an available slot in one period is likely available in successive periods. For DRFs, a simple view is that these are buffered until they can be passed through intermediate nodes in gaps between MCs or in the interstices intentionally introduced in each MC (transparency). It is generally accepted that electronic buffering consumes a small component of the cost and power consumption in existing routers. Priority classes can be used in handling DRFs and scheduling MCs, resulting in high utilization of line capacity.

D. Complement to Existing Internet Methodologies

As bandwidth demand and file size continue to increase, IP networks will struggle to scale. A suitable method to offload transactions of very large file size onto a complementary network specially designed to manage that file size offers an attractive evolution path.

IV. Media Frame Networking

There are two main aspects to networking with media frames. First, we need to define how to reserve a path for MC transmission while minimizing buffering and switching costs. Second, we must establish appropriate means for admitting, routing and queuing individual DRFs. A representative example of how this is done is now presented.

A. Signaling and Control

Signaling is needed to establish and update network state, schedule MC transmission, acknowledge receipt, and many other functions. Signaling could be 'in band' using time slots within the MF transport structure, or 'out of band'. One embodiment exploits the ubiquitous availability of traditional IP networks for out-of-band signaling. In what follows, we assume that each of our media aggregation and backbone routers (MAR, MBR) are able to signal through a suitable IP network.

Global Control: For simplicity, we use a centralized 'state server' to provide each router with global path, timing, and occupancy information. Each router updates status to the state server regularly, and the state server is able to calculate paths and approve initiation of a request for MC scheduling, as discussed below. Since each MC transfer is large, the number of transactions is manageable.

Distributed Control: Each router communicates directly with its neighbors and the state server. Each router continually updates the state server of status and load, and MARs request path and approval for MCs from the state server. Approval does not guarantee success, but suggests high probability. Communication between routers along the path determines ultimate success, as described below. This minimizes latency in each MC request-grant negotiation. For DRFs, each MAR controls admission based on local conditions and global information compiled by and downloaded from the state server.

B. Initial Setup and Topology Update

The topology must be known by the state server, which is then able to make globally informed responses to queries from routers. It is also useful for efficient scheduling to know the propagation time between nodes. Numerous methods can be implemented, like the ranging protocol used in PON, to estimate these times and report them to the scheduling server.

C. MC Scheduling

MCs are assembled and stored at end user machines for the time necessary to complete the request-grant operations. Once an MC is assembled, a request (control packet) containing at least the length of the MC, transparency degree, and destination is sent to the media aggregation router (MAR). The MAR then orchestrates negotiation with other network nodes to establish an end-to-end reservation. There are many ways to do this, for example:

1. MAR obtains from the state server approval to begin, a path, and the propagation time associated with each hop in the path.

Figure 4:
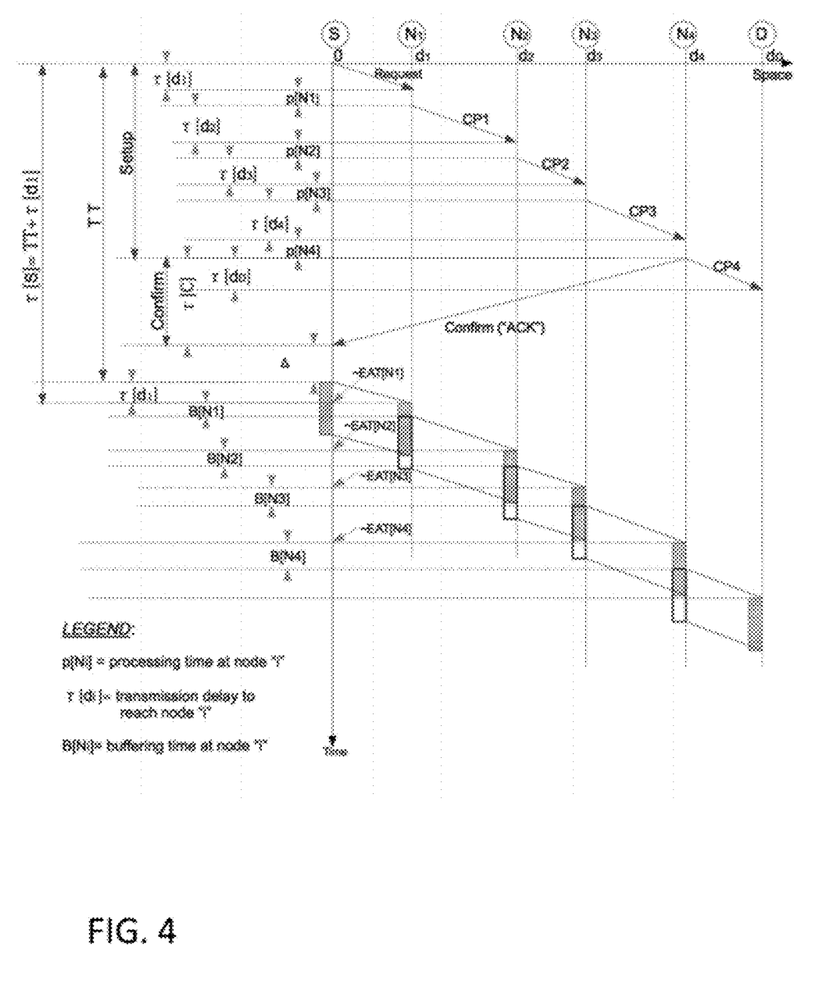
FIG. 4: Path Reservation and Transmission

2. MAR estimates a Time to Transmit parameter (TT). This is used by all routers along the path to search for available time slots in which to schedule the MC. TT is determined based on transmission and propagation delay from the user to the MAR, hop distances along the path and processing time for the control packets at each node, as shown in FIG. 4. At any given time, the maximum number of request packets that a MAR needs to buffer is not more than the transparency degree. Hence the maximum processing delay at each MAR is bounded by the value transparency degree× processing time for one control packet. The processing time for one control packet includes a quick check for resource availability on the outgoing channel. In this figure, the quantity $\tau[s]$ is the time at which the ingress MAR should start the search for suitable resources. The quantity $\Delta$ takes into account the time uncertainties for the network's hardware and $\tau[C]$ is the time for the confirmation to reach the source node.

3. MAR sends control packet (CP) to next node along path. This CP contains sender/destination address, MC length, transparency degree, expected arrival time (EAT $[N_i]$), and an ID that associates each CP to an MC. The value of EAT$[N_i]$ indicates to the node receiving the CP the amount of time to wait after the reception of the control packet and before the arrival of first bit of the MC.

4. The EAT field in the CP is updated before it is forwarded to each successive node to account for the additional transmission and processing delay (including any buffering delay). This continues until the destination (egress MAR) is reached or until a reservation fails.

5. If the reservation succeeds, a confirmation packet is sent over the IP network directly to the source node, which, upon receiving the confirmation packet, starts the transmission of MC. If reservation fails a "NACK" packet is sent over the reverse path to free resources and the source will retry to send the MC after waiting a random back-off time.

D. Directly Routable Frames (DRF)

DRFs are placed in any empty time slot, including the interstices of each MC, and can be preempted by MCs when the interstices are needed to accommodate a MC. DRFs are formed at the MARs or at the end user and have a header that is processed at each node for routing purposes.

E. Synchronization

Since the estimated expected arrival time for the MC is calculated using the physical hop delay (known globally) and the expected arrival time is carried in the CP there is no need for network-wide synchronization. A local timer at each node keeps track of the time difference between the reception of the CP and the expected arrival time of the relative MC as well as enabling the automatic release of previously booked timeslots as the time passes. Buffering at each router will compensate for time uncertainties in this estimation process and to align incoming MCs within the interstices of already scheduled MCs. Therefore, there is no need to buffer an entire MC.

F. A Representative Scheduling Algorithm

A possible implementation of the scheduling or booking algorithm follows. At the arrival of a CP, the search for a suitable slot begins, starting from the slot containing the EAT [Ni], carried within the CP. If a suitable slot is found within a number of time-slots (at least) equal to the transparency degree from the time slot containing the EAT [Ni], the MC is scheduled. By using the available timing information (i.e. beginning and ending time of each slot) and correctly calculating the buffering times B [Ni] needed for each MC (see FIG. 4), this booking algorithm tries to minimize the time wasted between the end of one scheduled MC and the beginning of the next.

V. Computer Environment

Figure 8:
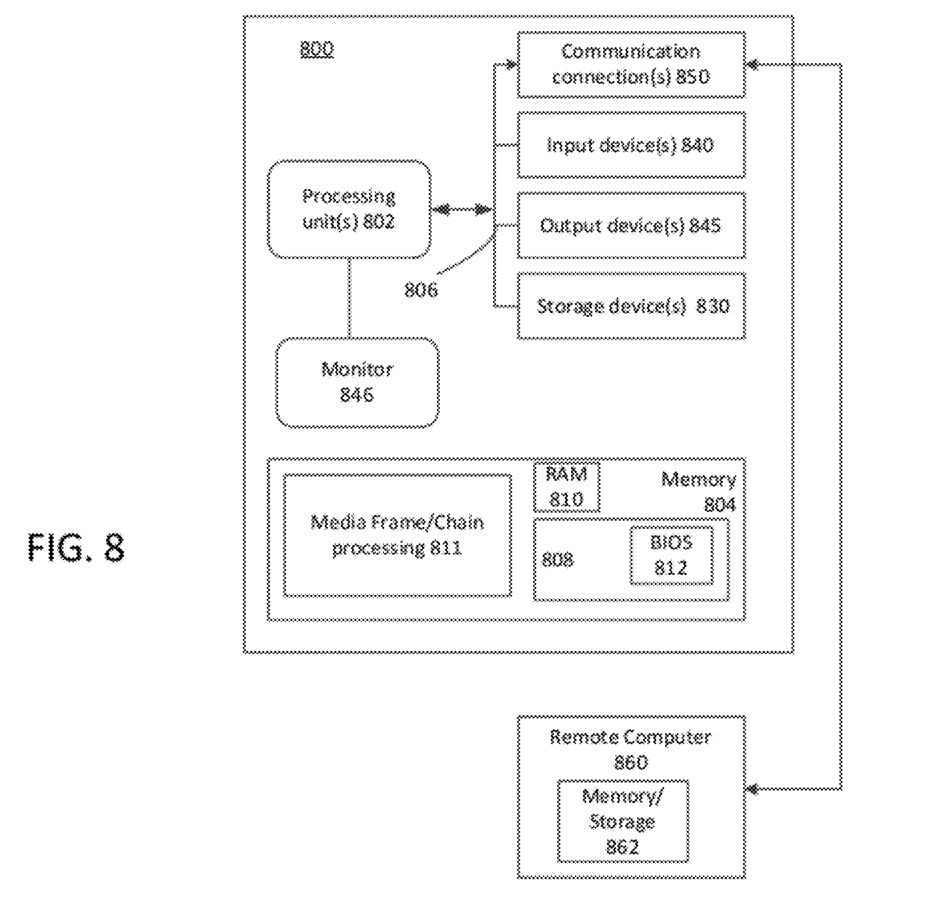
FIG. 8: Computer environment

FIG. 8 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. Each of the components described in FIG. 2 must execute a specific set of functions appropriate for the implementation of the overall concept. In similarity with traditional IP network infrastructure, the media backbone router would be a large high-performance special-purpose piece of networking hardware facilitating interconnection between multiple high-speed optical communication links. The media aggregation router would be a somewhat smaller networking device. The disclosed technology may also be practiced in distributed computing environments where tasks are performed by remote processing devices that are linked through a communications network. In a distributed computing environment, program modules may be located in both local and remote memory storage devices.

With reference to FIG. 8, an exemplary system for implementing the disclosed technology includes a general purpose computing device in the form of an exemplary conventional PC 800, including one or more processing units 802, a system memory 804, and a system bus 806 that couples various system components including the system memory 804 to the one or more processing units 802. The system bus 806 may be any of several types of bus structures including a memory bus or memory controller, a peripheral bus, and a local bus using any of a variety of bus architectures. The exemplary system memory 804 includes read only memory (ROM) 808 and random access memory (RAM) 810. A basic input/output system (BIOS) 812, containing the basic routines that help with the transfer of information between elements within the PC 800, is stored in ROM 808. Computer executable instructions for media frame/media chain processing can be stored in memory 811, or stored elsewhere.

The exemplary PC 800 further includes one or more storage devices 830 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 806 by a hard disk drive interface, a magnetic disk drive interface, and an optical drive interface, respectively. The drives and their associated computer-readable media provide nonvolatile storage of computer-readable instructions, data structures, program modules, and other data for the PC 800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 830 including an operating system, one or more application programs, other program modules, and program data. A user may enter commands and information into the PC 800 through one or more input devices 840 such as a keyboard and a pointing device such as a mouse. Other input devices may include a digital camera, microphone, joystick, game pad, satellite dish, scanner, or the like. These and other input devices are often connected to the one or more processing units 802 through a serial port interface that is coupled to the system bus 806, but may be connected by other interfaces such as a parallel port, game port, or universal serial bus (USB). A monitor 846 or other type of display device is also connected to the system bus 806 via an interface, such as a video adapter. Other peripheral output devices, such as speakers and printers (not shown), may be included.

The PC 800 may operate in a networked environment using logical connections to one or more remote computers, such as a remote computer 860. In some examples, one or more network or communication connections 850 are included. The remote computer 860 may be another PC, a server, a router, a network PC, or a peer device or other common network node, and typically includes many or all of the elements described above relative to the PC 800, although only a memory storage device 862 has been illustrated in FIG. 8. The personal computer 800 and/or the remote computer 860 can be connected to a local area network (LAN) and a wide area network (WAN). Such networking environments are commonplace in offices, enterprise-wide computer networks, intranets, and the Internet.

When used in a LAN networking environment, the PC 800 is connected to the LAN through a network interface. When used in a WAN networking environment, the PC 800 typically includes a modem or other means for establishing communications over the WAN, such as the Internet. In a networked environment, program modules depicted relative to the personal computer 800, or portions thereof, may be stored in the remote memory storage device or other locations on the LAN or WAN. The network connections shown are exemplary, and other means of establishing a communications link between the computers may be used.

Although not shown in FIG. 8, elements of the illustrated embodiments shown in software may be implemented in hardware and vice-versa. Also, the technologies from any example can be combined with the technologies described in any one or more of the other examples.

VI. Simulation Results

A MF network simulator was constructed using the OMNET++™ simulation package to test the MC reservation protocol under various load conditions. Arbitrary networks of media frame routers (MFR) can be configured, each hosting a number of end users that source and sink MCs. Each router receives traffic from the end users with an exponential distribution and variable mean for the inter-arrival rate of requests. Each router then executes the scheduling protocol and grants permission for end users to launch the MCs. Obvious simple topologies to explore are the fully connected mesh with uniform traffic and a network with a single congested link.

Figure 5:
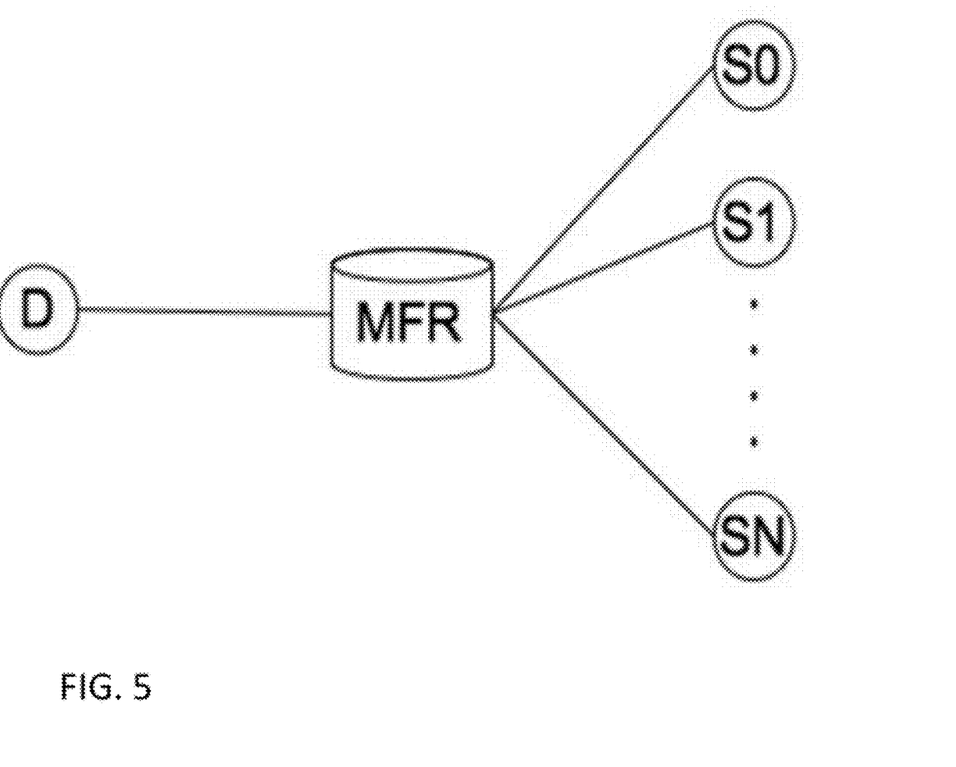
FIG. 5: Topology for congested link simulation

The network with a single congested link reduces to the simple network shown in FIG. 5. In a simple simulation, 8 source nodes transmit to one single destination (D) overloading the link MFR-destination node. The bit-rate on each link was 10 Gbps and each MC carries 1 GB of data (100 MF per MC) and has a transparency of 3.

Figure 6:
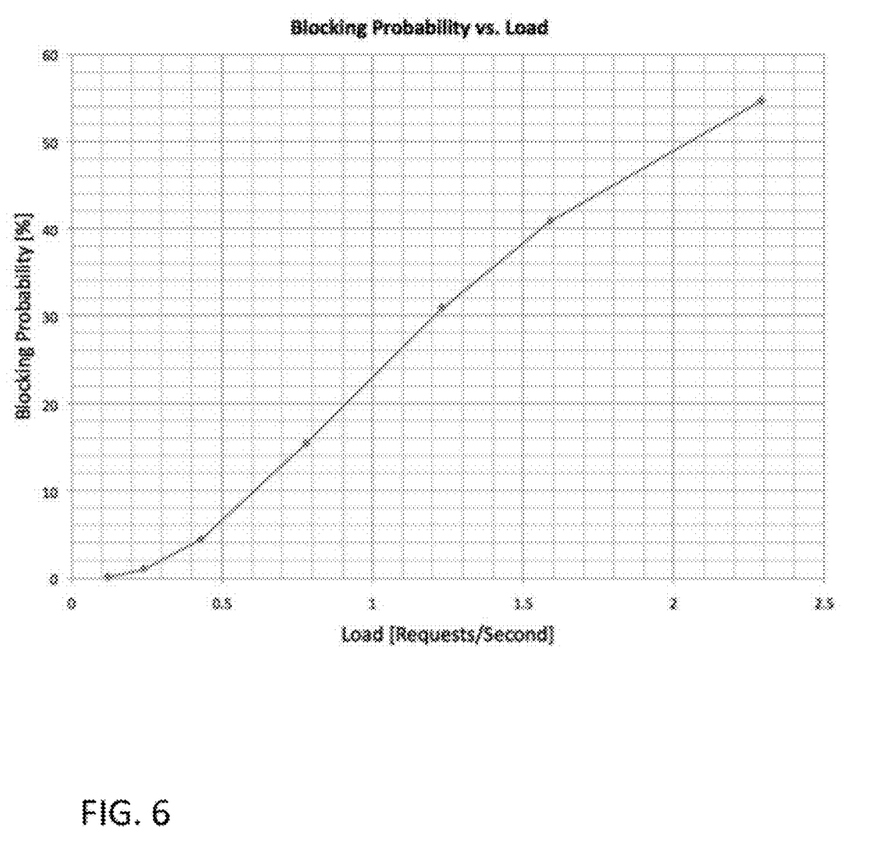
FIG. 6: Blocking Probability vs. Load
Figure 7:
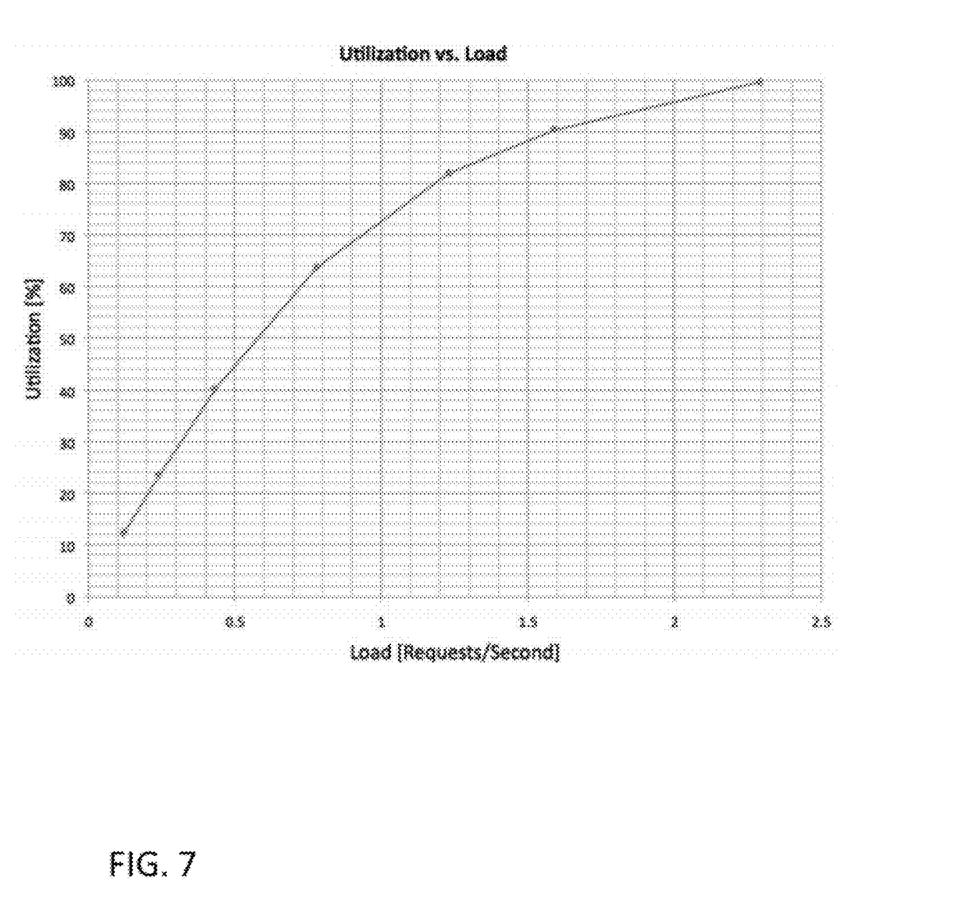
FIG. 7: Utilization vs. Load

The performance of the network in terms of blocking probability and channel utilization versus offered load (number of reservation attempts per second) are shown in FIG. 6 and FIG. 7.

Under ideal circumstances, to service one MC (100 MF) request (on average) per second would require 8 Gbps or 80% of the bandwidth on the congested link. However, blocking, interleaving and guard times between frames in interleaved MCs complicate matters. As shown in FIG. 7, we achieve 72% utilization, with 25% of requests blocked (FIG. 6). In this case, the guard time used was a very conservative 20% of a MF length, making one MF equivalent to 12 MB. Utilization correcting for this guard time is roughly 60%. For higher loads, utilization approaches 100% (80% net of guard time) and blocking increases to 65%. We anticipate far smaller guard times can be achieved. High utilization is one of the key advantages of scheduling packet transmission.

Given the very large MCs, scheduling is attempted only infrequently (maximum of 2.5 times per second in this case), minimizing processing and signaling loads. Since any successful reservation results in the transmission of an entire MC (1 GB in our scenario) and since the resources required for a failed reservation is minimal even for high load conditions (the actual MC leaves the source only if the reservation is successful), the network throughput and delay performance is reasonably good.

DRFs can be inserted into any of the individual MF slots that are not consumed by MCs. This can be left to chance, based on arrival and servicing of MC requests or time can be reserved, for example using one of the transparency slots, to ensure timely and efficient acceptance of DRFs.

VII. Summary

In this patent we disclose a novel evolution path for router networks based on the use of an overlay network designed specifically to support very large file transfers. Large files are segmented into large (~10 MB) media frames (MF) which can be directly routed (DRF) or concatenated into media chains (MC) for scheduled transmission. The proposed methodology aims to exploit the advantages of electronic switching, buffering and control plane while using high capacity WDM optical transmission. Anticipated benefits include a significant reduction in router power consumption, particularly that related to IP header lookup and switching, as well as increased network efficiency from scheduling large file transfers.

A hierarchical network architecture is defined, along with a high-level description of MF, MC, and DRF structure and use. A simulator has been developed to explore scheduling algorithms and show the potential of this new methodology in terms of blocking probability and link utilization under various load conditions. Preliminary results illustrate the high efficiency achievable with scheduling. The large size of scheduled MCs and the use of DFRs for individual MFs minimize signaling overhead.

IP networking has had unprecedented impact on communications, the global economy, and society. But continuing growth of bandwidth-hungry media applications is revealing challenges in scaling these networks which have not changed fundamentally since 10 KB was considered a large file. The MF-based overlay approach presented may provide an effective complement to present IP methods while addressing power and bandwidth scaling limitations.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
   dividing content into a plurality of media frames having a pre-determined common block size so as to define a first media chain;
   establishing one or more interstices between the media frames of the first media chain;
   including a media chain header in at least one of the plurality of media frames of the first media chain, the header comprising indications of a media frame length; and
   communicating the first media chain by interleaving with a second media chain and at least one directly-routable frame based on the interstices between the media frames of the first media chain.

2. The method of claim 1, wherein the media chain header comprises an indication of a number of interstices between the media frames of the first media chain.

3. The method of claim 1, further comprising reserving a path for communication of at least one of the first media chain and the second media chain.

4. The method of claim 1, further comprising:
   requesting a path for communication of the first media chain; and
   communicating the first media chain in response to approval of the path request.

5. The method of claim 4, wherein the requesting the path includes communicating a control packet associated with the media chain length, a media chain transparency, and a media chain destination of the first media chain.

6. A method, comprising:
   communicating a request for transmission of a first media chain comprising a plurality of media frames, the request including at least one of a media chain length and a media chain destination, the media frames having a predetermined length, and wherein the media frames are separated by interstices at predetermined locations;
   receiving a reservation confirmation in response to the request for transmission; and
   initiating transmission of the first media chain in response to the reservation confirmation, wherein the transmission of the first media chain includes interleaving at least one directly-routable frame and a second media chain into the interstices of the first media chain.

7. A method, comprising:
   dividing content into a plurality of media frames so as to define a media chain having concatenated media frames, wherein the media frames have a predetermined size and a media chain length corresponds to an integer number of media frames in the media chain;
   establishing one or more interstices between the media frames;
   including a media chain header in each of the plurality of media frames, the header comprising indications of at least one of the media frame length and media frame interstice locations; and
   communicating the media chain, at least one additional media chain, and a directly-routable frame inserted into the one or more media chain interstices.

8. A method for communicating data files through a router network comprising:
   packaging the data files into a plurality of media frames having a predetermined length, the media frames comprising header information and payload, said header information comprising at least address information;
   defining a concatenation threshold, such that data files that occupy a greater number of media frames than the concatenation threshold are concatenated into a plurality of media chains which contain interstices;
   scheduling transmission of the plurality of media chains through the router network; and
   directly routing the media frames from the data files below the concatenation threshold through the router network in the interstices of the plurality of media chains.

9. A router, comprising:
a processor; and
a memory coupled to the processor and storing processor-executable instructions for:
- dividing content into a plurality of media frames so as to define a media chain;
- establishing one or more interstices between the media frames of the media chain;
- including a media chain header in at least one of the plurality of media frames, the header comprising indications of at least one of the media frame length and media frame interstice locations; and
- communicating the media chain interleaved in interstices associated with one or more additional media chains and with at least one directly-routed packet placed in a selected interstice.

10. The router of claim 9, wherein the stored processor-executable instructions further include instructions for:
- receiving a request for transmission of the media chain, the request including at least one of a the media chain length, a media chain transparency, and a media chain destination;
- identifying a path having a plurality of hops for communicating the media chain;
- receiving information describing a propagation time associated with one or more hops in the path; and
- identifying available time slots for communication of the media frames of the media chain at the plurality of hops in the path, wherein the time slots are identified based on one or more of the transmission and propagation delays to the router, hop distances along the path, and propagation and processing times associated with at least one hop of the path.

11. The router of claim 9, wherein the stored processor-executable instructions further include instructions for inserting a directly-routable frame into an interstice introduced into the media chain or between the additional media chains.

12. The router of claim 10, wherein the processor-executable instructions further includes instructions for communicating a control packet to at least one node along the path, the control packet including one or more of a sender address, a destination address, the media chain length, the media chain transparency, an expected arrival time, and an identifier associated with the media chain.

13. The router of claim 10, wherein the processor-executable instructions further include instructions for communicating a reservation confirmation responsive to the request for transmission of the media chain.

* * * * *